United States Patent
Fussell et al.

(10) Patent No.: US 7,024,492 B2
(45) Date of Patent: Apr. 4, 2006

(54) MEDIA BUS INTERFACE ARBITRATION FOR A DATA SERVER

(75) Inventors: Andrew M. Fussell, Vancouver (CA); Paul Robert Russell, Port Coquitlam (CA)

(73) Assignee: Convedia Corporation, Vancouver (CA)

( * ) Notice: Subject to any disclaimer, the term of this patent is extended or adjusted under 35 U.S.C. 154(b) by 627 days.

(21) Appl. No.: 10/153,666

(22) Filed: May 24, 2002

(65) Prior Publication Data

US 2003/0221019 A1 Nov. 27, 2003

(51) Int. Cl.
G06F 15/16 (2006.01)

(52) U.S. Cl. .................. 709/253; 709/207; 709/240

(58) Field of Classification Search ................ 725/119; 370/412, 438; 709/250, 253; 710/240, 241, 710/242, 243, 244, 300
See application file for complete search history.

(56) References Cited

U.S. PATENT DOCUMENTS

| | | | | |
|---|---|---|---|---|
| 4,866,702 A | * | 9/1989 | Shimizu et al. | 370/438 |
| 5,764,895 A | * | 6/1998 | Chung | 709/250 |
| 5,892,766 A | * | 4/1999 | Wicki et al. | 370/412 |
| 6,112,271 A | * | 8/2000 | Lanus et al. | 710/306 |
| 6,249,834 B1 | * | 6/2001 | Henderson et al. | 710/313 |
| 6,282,195 B1 | | 8/2001 | Miller et al. | |
| 6,442,758 B1 | * | 8/2002 | Jang et al. | 725/119 |
| 6,563,837 B1 | * | 5/2003 | Krishna et al. | 370/413 |
| 6,662,254 B1 | * | 12/2003 | Tal et al. | 710/300 |
| 6,693,914 B1 | * | 2/2004 | Jones et al. | 370/461 |
| 6,826,191 B1 | * | 11/2004 | Jones et al. | 370/401 |

FOREIGN PATENT DOCUMENTS

| | | |
|---|---|---|
| EP | 0 727 750 A2 | 8/1996 |
| WO | WO 97/31460 | 8/1997 |
| WO | WO 00/38375 | 6/2000 |

* cited by examiner

*Primary Examiner*—John Follansbee
*Assistant Examiner*—Kenny Lin
(74) *Attorney, Agent, or Firm*—Marks & Clerk; Richard J. Mitchell

(57) ABSTRACT

A data server for use in networks where media data are transmitted in packet form comprises at least one card shelf containing at least a bus controller card, a plurality of media processor cards, and a backplane. The backplane has a plurality of media buses, which carry data in packet form among the cards installed on the shelf. Each card has at least one bidirectional port with its own unique identity, and each bidirectional port outputs flow control information as to whether that port can or cannot accept packets of data that are intended to be sent to it, as well as transmit requests to transmit packets of data from that port. Each card outputs flow control information for each bus. A bus arbiter reviews each request to transmit and each flow control message, and grants requests to transmit media data packets only when the intended destination address is free to receive a media data packet over a free bus. Priority may be assigned to each data packet; and a processing algorithm in the bus arbiter determines the order of processing requests to transmit packets of data, and balances the priorities of ports and cards, and their respective requests.

13 Claims, 3 Drawing Sheets

MEDIA BUS INTERFACE ARBITRATION FOR A DATA SERVER

FIELD OF THE INVENTION

This invention relates to data servers for use in networks where media are transmitted in packet form. In particular, the present invention relates to data servers which are configured as a media server, wherein a shelf arrangement that includes a plurality of media processor cards, and a plurality of media buses on the backplane, is provided. The present invention particularly provides for arbitration as to the manner in which the control of packets of data from various cards within the data server shall be controlled. The data server may, however, function as a media server or a media gateway, particularly in telephony networks, video conferencing networks, and the like.

BACKGROUND OF THE INVENTION

Data servers generally find themselves in many circumstances for many purposes. However, the present invention is particularly directed to the use of data servers in media networks where the media data are transmitted in packet form. Such uses may specifically be in the purposes of media gateways and media servers for media networks such as telephony networks.

Indeed, it is in the environment of telephony networks, in particular, where the present invention finds particular utility. Telephony networks carry voice data, in particular, which has been coded into digital format. However, while the human ear may be forgiving to a certain extent, it will not tolerate significant interruptions or delay in the passage of spoken messages. In other words, unlike data networks in which delays or interruptions in the delivery of packetized data may be tolerated, at least to some extent, the transmission and processing of voice messages, and also video messages and the like, must take place essentially in real time. Thus, data servers such as gateways and media servers must be constituted in such a manner that they are capable of functioning with high throughput and accuracy of data management and processing.

The following discussion is particularly directed to media servers, but it will be understood that the discussion is applicable as well to gateways and the like, as will be clear to those who are skilled in the art.

Media servers are employed in telephony networks, and perform a variety of basic and enhanced services which include conferencing, interactive voice response, transcoding, announcement, and other advanced speech services. They may also be employed in networks which provide video conferencing services, as well as typical data exchange services of the sort which occurs over the Internet, over virtual private networks, within wide area networks and local area networks, and the like. In each instance, the data of any sort, whether it be voice, video, or numerical or text data, is packetized—that is, the data are sent in packets.

Media servers are connected directly to a packet network, and may therefore be found in use in many service provider locations including those who provide wireless, cable modem, xDSL, fibre, and copper access technologies; provided, however, that the core network within which the immediate server may be found is one which is based on packet technologies such as IP and ATM.

Media servers perform realtime processing of media streams which may originate from such devices as personal computers, IP phones, mobile phones, and traditional phones, via an appropriate media gateway. Typical functions that may be performed by media servers include decoding and collecting DTMF tones, they may play complex audio announcements, they may bridge multiple audio signals, they may transcode between different codec types and bit rates, they may level shift audio signals for automatic game control, and convert text to speech or speech to text. Media servers may also recognize voice commands, bridge video signals, and decode/encode fax streams.

Typically, media servers are part of an enhanced services infrastructure in softswitch architecture. The media servers will act as slaves to service logic which is resident in an application server or in a softswitch, and provide state-of-the-art hardware which may be upgraded and which exhibits almost unlimited scaleability, without regard to the service logic which may be employed in an application server or softswitch, and without regard to whether or not there is the presence of a media gateway such as that which is required for other than VOIP telephony.

In this invention, the particular purpose is to provide an arbitration technique on a backplane of a card shelf in a media server, so as to provide for inter-card communication. By that, the present invention provides an arbitration technique which will efficiently manage traffic along the media buses within the backplane of a card shelf in the media server.

Briefly, the present invention provides for a data server where a media processor card will request the right to transmit a packet of data on the media bus. A bus arbiter which is found on the bus controller card on the card shelf will arbitrate between the various media processor cards wishing to send packets of data, and assign each media processor card a particular bus on which it will communicate with another bus or buses.

In doing so, the bus arbiter will review requests to transmit packets of data in keeping with certain criteria. However, each decision is made on per packet basis.

Thus, a flow control mechanism is provided which ensures delivery of packets of data to their intended destinations; and thereby throughput time and a risk of blockages are improved.

SUMMARY OF THE INVENTION

To that end, the present invention provides a data server for use in networks where media are transmitted in packet form, and where such media may be such as packetized audio data, packetized video data, packetized control data, packetized information data, and combinations thereof.

The data server comprises at least one card shelf that contains at least a first card having a bus controller function, a plurality of media processor cards, and a backplane.

The backplane includes a media bus group having a plurality of media buses therein.

Each of the plurality of media buses is adapted to carry media data in packet form among the cards which are installed on the shelf.

Each media processor card on the shelf is assigned a specific identity.

There is at least one bidirectional port on each media processor card, from and to which packets of media data may be transmitted.

Each of the bidirectional ports on each media processor card has its own identity on its respective card.

When any bidirectional port on any media processor card wishes to send the packet of media data to another bidirectional port on any media processor card, it issues a request to transmit that packet of data.

The request to transmit the packet of media data includes the identity of the intended receiving card, and the identity of the receiving bidirectional port on the intended receiving card.

Each bidirectional port on each media processor card outputs flow control information as to whether that bidirectional port can or cannot accept packets of media data that are intended to be sent to it, at any instant in time.

Also, each media processor card will output flow control information for each bus in the media bus group, as to whether that card can or cannot accept packets of media data that are intended to be sent to it over a respective bus at any instant in time.

According to a particular feature of the present invention, a bus arbiter is found on the at least first card which has the bus controller function. The purpose of the bus arbiter is to review the flow control status of each output position of each respective media processor card, and also to review the flow control status of each bidirectional port on each respective media processor card. Further, the bus arbiter will review the flow control status of each bus in the media bus group and it will process requests to transmit packets of media data from each media processor card. The bus arbiter will grant requests to transmit packets of media data only for those packets of media data that are intended to be transmitted to destination addresses that are not flow controlled, where the grants are given only for transmissions over buses that are not flow controlled.

All of the ports and all of the cards that have received grants to transmit packets of media data will place their specified packets of media data onto the respective granted buses, starting at the same instant in time.

Typically, each media processor card has a plurality of bidirectional ports thereon, from and to which packets of media data maybe transmitted. Each of the plurality of bidirectional ports has its own respective identity.

Also, typically in such an instance as noted immediately above, each bidirectional port on each media processor card has an urgent flag which it may set when necessary. When any packet of media data is to be sent from any bidirectional port on any media card, and that packet of media data has a high priority, than each respective bidirectional port on each respective card having such a high priority packet of media data to be sent, will set its urgent flag—that is, the urgent flag will be raised.

Typically, the first card on the shelf is a shelf controller card, and it has the bus controller function included therein. It is, of course, possible that a separate bus controller card will also be found on the shelf.

In any event, in any configuration of data server in keeping with the present invention, each bus in the media bus group will have its own respective identity.

The requests to transmit packets of media data which are processed by the bus arbiter, may be processed in such a manner that those requests which have a high priority will be processed before any other requests having a lower priority.

Typically, the bus arbiter will determine the order in which the requests to transmit packets of media data are to be processed, in keeping with a predetermined algorithm which is found in the bus arbiter.

The algorithm in the bus arbiter may be such that when requests to transmit packets of media data are to be processed by the bus arbiter in keeping with the predetermined algorithm, those requests having a higher priority will be processed before those requests having a lower priority.

Moreover, the algorithm may be such that requests from media processing cards having more packets of media data to be transmitted at any instant in time, are processed prior to requests from media processor cards that have fewer packets of media data to be transmitted at that instant in time.

Still further, when any requests to transmit packets of media data are not granted, then those requests will be given a higher priority by the bus arbiter for the next instant in time when the request to transmit packets of media data are to be processed.

The bus arbiter may be adapted to balance the priority of bidirectional ports and media processor cards, in keeping with the predetermined algorithm, in such a manner that no port and no card has an unfair advantage over any other port or any other card, respectively, as to the requests to transmit packets of media data being sent by those ports and those cards.

As is noted herein, a data server in keeping with the present invention may be configured as a media server for use in networks wherein packetized voice data are transmitted through the network.

However, a data server in keeping with the present invention may also be configured as a media gateway, for use in networks wherein packetized voice data are transmitted through the network.

Each bidirectional port on each media processor card of any data server in keeping with the present invention, has at least one receive buffer associated with it.

The flow control information which is output by each bidirectional port on each media processor card, is typically and quite simply by way of setting a flow control flag for each one of the bidirectional ports on that card.

Also, the flow control information for each bus in the media bus group, is typically and simply by way of a flow control flag for each respective bus.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention as to its structure, organization, use and method of operation, together with further objectives and advantages thereof, will be better understood from the following discussion.

It has been noted herein that data servers in keeping with the present invention may typically be figured as media servers, or as media gateways, for use in networks wherein packetized voice data are transmitted through the network. Of course, more broadly stated, a data server in keeping with the present invention may be used in any network where media are transmitted in packet form, and where the media are typically packetized audio data, packetized video data, packetized control data, packetized information data, and combinations thereof.

However, the following discussion is particularly directed to a data server which, in terms of its configuration, is set up to function as a media server.

Figure 1:
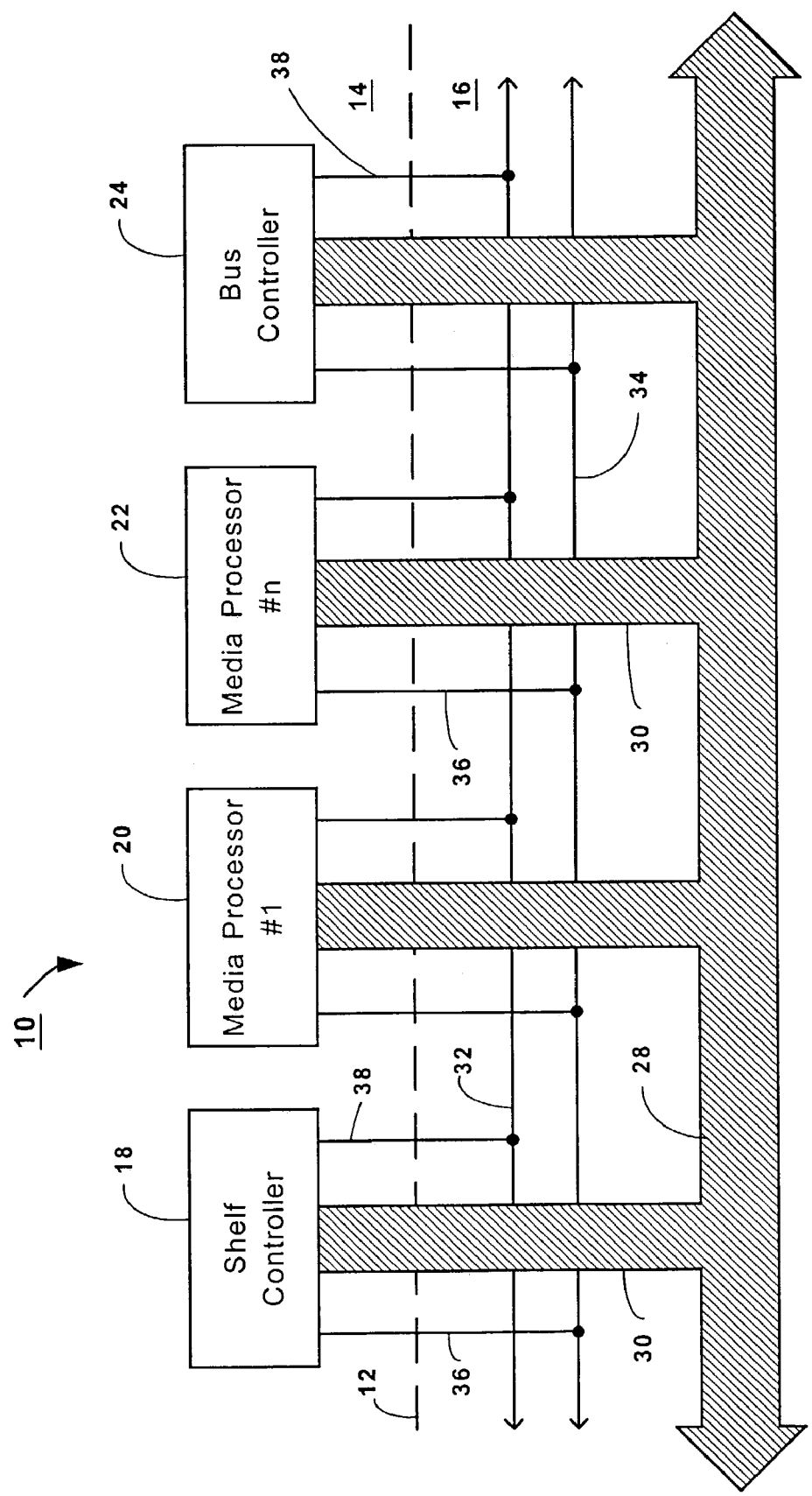
FIG. 1 is a block schematic of a card shelf of a data server in keeping with the present invention, showing a plurality of cards on the card shelf, and buses on the backplane of the card shelf.

Turning first to FIG. 1, a typical block schematic of a card shelf for a data server which is in keeping with the present invention, is shown at 10. The card shelf has a plurality of slots into which various cards are plugged; and there is an interface 12 between the slot portion 14 of the card shelf, and the backplane 16.

Among the cards which are plugged into the card slots on the card shelf there are a shelf controller card 18, and a plurality of media processor cards 20, 22. It will be noted that the media processor card 20 is indicated to be the number 1 card, and that media processor card 22 is indicated to be media processor card number N.

In some circumstances, there may also be a bus controller card 24 which is present on the card shelf; although typically, the functions of the bus controller card, and particularly and in any event in keeping with the present invention the functions of a bus arbiter as discussed hereafter, will be found on the shelf controller card 18.

There will typically be at least three media processor cards 20, 22, and usually up to ten or twelve media processor cards 20, 22.

Within the backplane 16 there are a plurality of media buses which are shown collectively at 28. Each of the media buses is connected by way of a media bus connector 30 to the respective cards 18 . . . 24.

There may also be some other "housekeeping" buses within the backplane 16, including a clock bus 32 and a media frame bus 34 which are connected to each of the cards 18 . . . 24 by bus connectors 36 and 38, respectively.

Typically, the media bus 28 comprises up to 18 separate buses which are each 8 bits wide. In a typical media server in keeping with the present invention, each of the buses operates at 45 MHz.

Of course, each 8 bit wide bus will handle inter-card data. A single packet of media data can be sent over any one of the buses; and as many packets of media data as there are available buses can be sent to the same card at the same time, one packet of media data on each media bus.

There is an active bus arbiter for each shelf, found within the shelf controller card 18. The bus arbiter has a number of purposes, among them being to read the transmission requests from all cards, and to grant backplane buses 28 for packet transmission.

It has been noted above that framing information is sent to the cards on the shelf, along the bus 34. During each frame, each of the media processor cards 20, 22 will send out information indicating on which of the media buses 28, and on which of its bidirectional ports, that particular card can receive a packet of data.

As noted, there is at least one bidirectional port on each card; and typically, there may be as many as eight bidirectional ports on each card. Packets of media data may be transmitted to and from each bidirectional port; and each bidirectional port has at least one, and typically as many as six, receive buffers associated with it. The purpose of the receive buffers is to temporarily hold packets of data before the data may be processed at each respective bidirectional port.

Each bidirectional port will transmit flow control information to the local card on which it is located. That flow control information which is output by each bidirectional port on each media processor card will contain information as to whether that individual bidirectional port has any available buffers into which new packets of data may be received.

Moreover, each card has a number of receive buffers—typically, two receive buffers—for each media bus on the media bus group 28. Those receive buffers are of a general nature, and can receive data packets for any of the bidirectional ports on the respective card. If the destination bidirectional port is unable to accept data packets, and both buffers for a particular media bus are full, than that card will raise its flow control flag for that media bus, thereby letting the bus arbiter know that it cannot accept any more packets of data on that particular media bus.

However, when a data packet is transferred to the destination bidirectional port, and the receive buffer is thereby freed, than the card will lower its flow control flag, telling the bus arbiter that it is now able to accept data from the specified media bus.

Of course, each of the bidirectional ports on each media processor card has its own port number on its respective card.

A basic description of what happens when a bidirectional port on any one media processor card 20, 22 wishes to send a packet of media data to another bidirectional port on that card or on another card 20, 22 over the media bus 28, now follows:

First, in order for a media data packet to be transmitted over a media bus 28, a bidirectional port on the card 20, 22 which wishes to send that packet of media data will issue a request to its local card to transmit that packet of media data.

That request to transmit data will contain the destination card number, and the destination bidirectional port number. It may also contain an urgent flag, thereby marking the request to transmit data as being urgent. Urgent flags are used to mark data that is high priority; and if possible, such data should be transmitted before other non-urgent data.

Typically, urgent flags are placed on packets which contain control data, or in any event such packets are given a higher priority than packets which contain media data.

Reference is now made to FIGS. 2 to 8, which assist in the understanding of the manner in which transmit requests may be made, priorities assigned and handled, priorities may be shifted, and so on.

Figure 2:
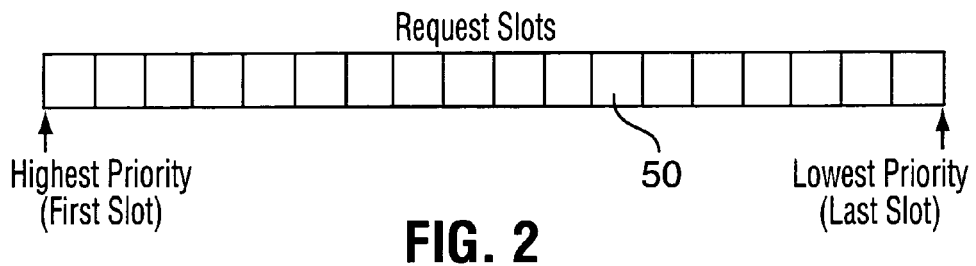
FIG. 2 graphically illustrates the manner in which request slots for requests to transmit packets of media data are established.

First, it is noted in FIG. 2 that there may be a plurality of request slots 50; and the first slots have the highest priority—shown at the left end in FIG. 2—with the last slot—shown at the right end—having the lowest priority.

Each card places its requests into its own request slots, which are arranged in the manner shown in FIG. 2.

Figure 3:
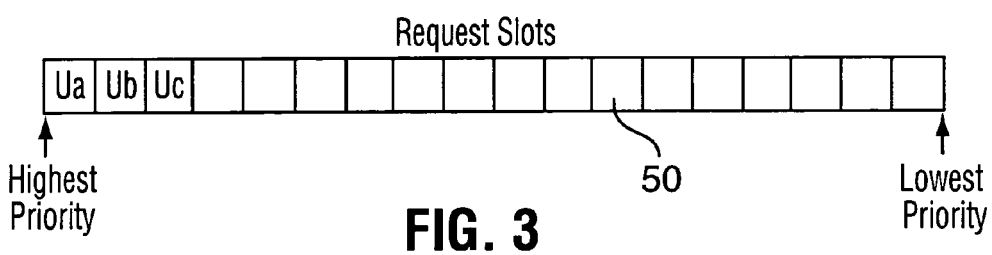
FIG. 3 is similar to FIG. 2, showing urgent requests to transmit packets of media data having been added.

The card will first check to see if any requests have an urgent flag that has been set. It will then place the urgent requests in the highest priority request slots, as seen in FIG. 3. In order to balance the priority of all of the bidirectional ports on the card, the card will accept a maximum of one urgent request per bidirectional port, before checking to see if any of the other bidirectional ports have any urgent requests.

Typically, the card will also rotate which bidirectional ports that it will poll first during each transmission cycle to determine if the port has an urgent request. For example, if a card has five bidirectional ports, the card will query the first port, then the second, then the third, fourth, and fifth, before returning to the first port to see if it has a second urgent request. However, in the following transmission cycle, the card will start with the second port, then the third, fourth, fifth, and then the first port. It continues to rotate the order in which it will poll its ports, thereby balancing the priority of each of the ports.

As seen in FIG. 3, three urgent requests have been made, shown at Ua, Ub, and Uc, respectively.

Figure 4:
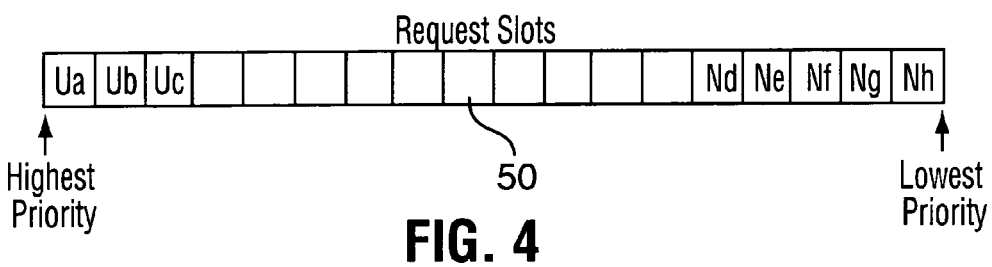
FIG. 4 shows the placement of non-urgent requests into request slots.

Now, as seen in FIG. 4, the card will then place all of its non-urgent requests into the request slots, in the order that the requests are received by the card. Once again, in order to balance the priority of all of the bidirectional ports on the card, the card will accept a maximum of one non-urgent request per bidirectional port, before checking to see if any other bidirectional ports have any non-urgent requests.

Moreover, the card will also rotate which bidirectional ports that it will ask first to determine if it has any non-urgent requests, for each transmission cycle, as before.

FIG. 4 shows a number of non-urgent requests having been assigned to the lowest priority request slots by the card, as seen at Nd, Ne, Nf, Ng, and Nh, respectively.

After the request slots have been filled in the manner shown in FIG. 4, the card will then transmit its request slots list, along with its flow control information, to the bus arbiter.

The bus arbiter which is on the bus controller card 24, will receive the transmit request and flow control information from all of the other cards on the shelf, as well. The bus controller card 24 will then use its internal bus arbiter logic—typically, a predetermined algorithm—to determine which cards can transmit on which bus, at that time.

Figure 5:
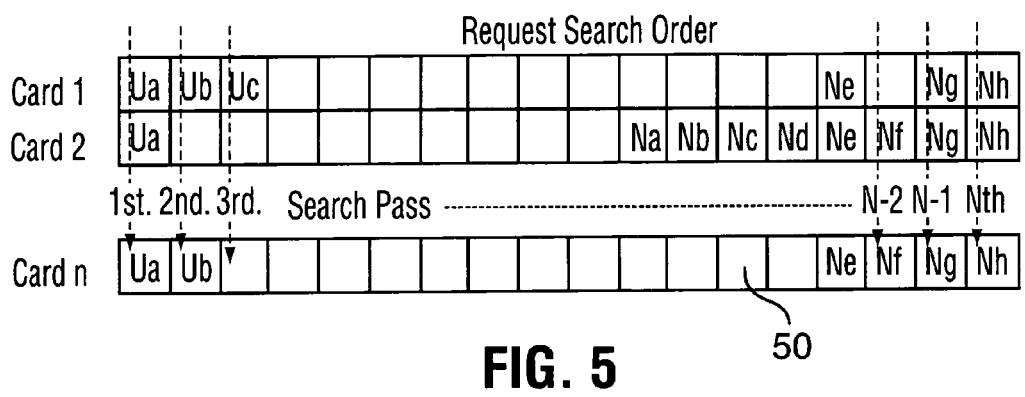
FIG. 5 illustrates the manner in which the search order among the cards making requests will be made by the bus arbiter.

Once the bus arbiter has received all of the requests from all of the cards, the bus arbiter will then start searching the request slots for requests to process. It will start by searching the highest request slot from card 1, followed by the highest request slot from card 2, and so on up to the highest request slot on card n. This is shown in FIG. 5.

If the bus arbiter finds requests, it will then proceed to process that request. However, if it does not find a request, it will then start by checking the second highest priority request slot from card 1, followed by the second highest request slot from card 2, and so on. The bus arbiter will continue its search until all of the requests have been processed.

In the following transmission cycle, the bus arbiter will begin by checking the transmission requests of card 2 first, then followed by card 3, and so on through card n, and finally to card 1. It will continue to rotate which card will be the first card that it will search during each transmission cycle, thereby balancing the priority of all the cards in the shelf.

Having determined the transmission requests, and their priorities the bus arbiter will then check the flow control for the destination bidirectional ports on each specific media processor card 20, 22, to which any packet of data is to be sent. That is, it will check the intended port on the intended card for each packet of media data for which a transmit request has been made.

First, the bus arbiter will check to make sure that the requested destination port is not flow controlled. If the destination port is not flow controlled, then the bus arbiter will compare the buses that the destination card is able to accept packets on with the buses that have not already been granted, and/or with the buses that are not out of service. If the arbiter finds a matching bus, it will then grant that bus to that request.

By checking the flow control of the destination port and card, the bus arbiter guarantees that the media packet can be received at the intended port and card.

However, if the bus arbiter can not find a free media bus, or if the destination port is flow controlled, then the transmit request will be discarded. If so, then the port on the media processor card 20, 22 which wanted to send a packet of media data will have to issue the same request in the next frame.

When the bus arbiter has finished processing all of the requests, it will then issue the grants to the requesting cards.

Then, if any requesting card sees that any of its requests that it had issued have been granted, the card will remove the granted requests from the request slots on its own request slot array, and the packet associated with that request will be transmitted across the bus that has been granted, during the following transmission frame. When any of the media processor cards 20, 22 sees a grant for one of its requesting bidirectional ports, it will then enable that port to output its packet of media data on the correct bus which has been assigned to that packet of media data, during the next frame.

However, if a request has not been granted after a certain number of backplane transmission cycles, the card will remove the request from its request slot, and the packet will be discarded. The packet will be considered to have "Timed Out".

Figure 6:
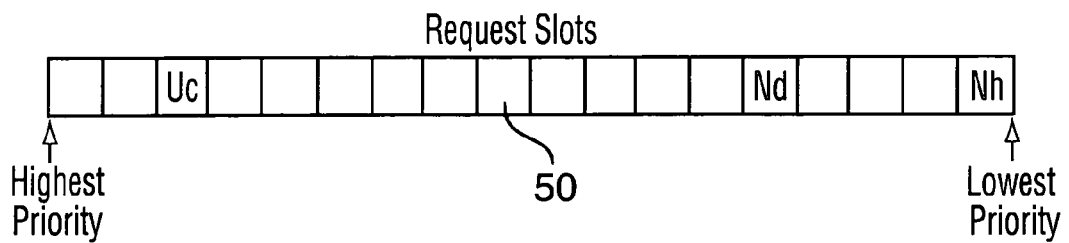
FIG. 6 illustrates the request slots after all granted and timed-out requests have been removed.

FIG. 6 illustrates that three requests—Uc, Nd and Nh—for a particular card remain after all of the granted requests and timed out requests have been removed from the request slots.

Figure 7:
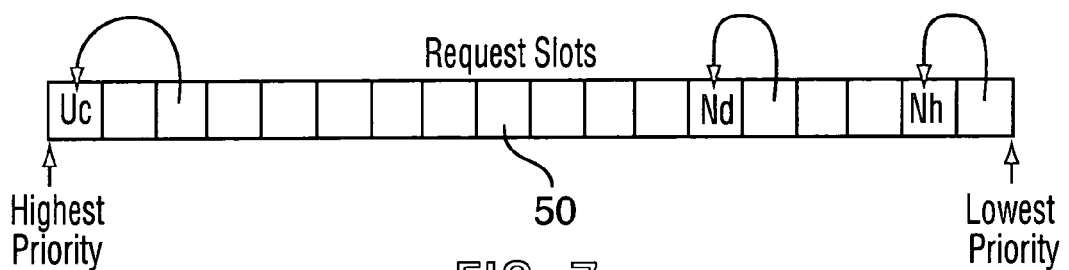
FIG. 7 shows the manner in which the priority for remaining requests will be shifted upwards as to their priority.
Figure 8:
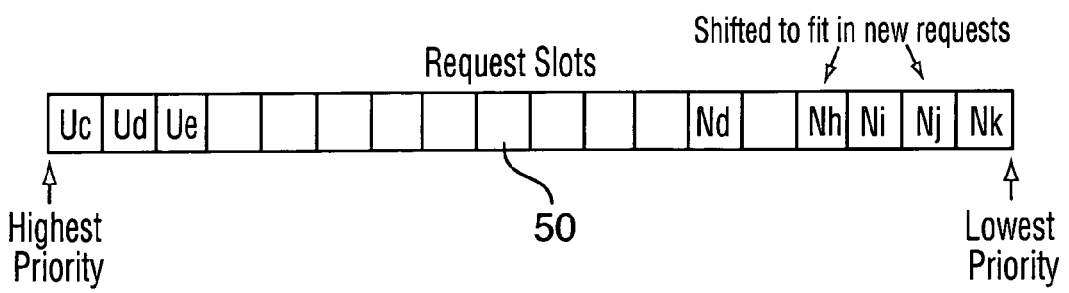
FIG. 8 shows new requests having been added to the request slots after requests have been shifted as shown in FIG. 7.

Then, if a grant was not issued to a request on the previous transmission frame, as seen in FIG. 6, and the request has not timed out, the card will shift the request to the next higher request slot if possible. Urgent requests will be shifted until they are in the highest possible request slot. This is shown in FIG. 7, where the urgent request Uc has been shifted to the highest priority request slot; and each of the non-urgent requests Nd and Nh have been shifted one request slot higher.

Then, the card will check to see if any new requests have been made by any of its bidirectional ports, and it will place them in the request slots. Once again, it will place any new urgent requests in the high priority slots; but it will be seen that the new urgent requests Ud and Ue are placed in lower request slots than the remaining urgent request Uc. Of course, those requests are placed in higher slots than any regular requests.

The non-urgent requests are then placed into request slots, but they are assigned to lower priority than the older non-urgent requests. Thus, it may be necessary to shift the older non-urgent requests in order to fit the new non-urgent requests into the request slots; and it will be seen that non-urgent request Nh has been shifted a further two slots to the left (higher) than it was previously allocated.

Thus, the backplane has been arbitrated, and high priority or urgent packets are allowed to be transmitted before non-urgent packets.

The system of the present invention, as it has been described above and as it is effected by a predetermined algorithm found in the bus arbiter, allows for the card which has the largest number of packets to be transmitted to have a higher priority than a card which has less data to send. This avoids any possible bottlenecks.

At the same time, the bus arbiter will continue to increase the priority of requests that have not been granted, so that a card which has little data to send will not be completely blocked by a card that has a significant amount of data to be sent.

Still further, the bus arbiter balances the priority of cards within the shelf, and the bidirectional ports within the card, all in the manner as noted above.

Of course, when any of the media processor cards 20, 22 sees a packet of media data on any media bus 28 which specifies that card as the destination card, then the media processor card will place the packet of media data into its buffer for the bus on which the packet is to be transmitted.

However, if the media processor cards 20, 22 cannot empty its received buffer or buffers before the next frame, it will then raise its flow control flag for that particular media bus, in the output position of the card, during the current frame. This action informs the master bus controller card 24 that it should not send another packet of media data to that card on that bus, until such time as the received buffer has been emptied and the flow control flag for that bus has been lowered.

On the other hand, any transmit request that does not get granted within a predetermined period of time—typically, 32 frames—will time out, and the packet of data will be lost. This prevents a request to transmit to a card that has failed from permanently preventing the requesting port from transmitting to other cards that are still active.

There has been described a data server having a card shelf which has a backplane on which a plurality of media buses are placed. Bus arbitration techniques have been particularly described, so that data interchange among media processor cards on the card shelf, where the data interchange is by way of media data packets, is assured to be fulfilled. A packet of media data may be sent from one card to another, or it may be sent from one card to a plurality of cards; and the bus arbitration which has been described will permit such media data packet transmissions and broadcasts.

It will be understood, of course, that because there is a plurality of media buses 28, and there are mechanisms to determine if any card or any media bus has failed, then there is redundancy without the necessity for duplicating the shelf or bus structures.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A data server for use in networks where media are transmitted in packet form, where such media are chosen from the group consisting of packetized audio data, packetized video data, packetized control data, packetized information data, and combinations thereof, said data server comprising:

at least a first card shelf containing cards installed thereon including a card having a bus controller function and a plurality of media processor cards, and a backplane;

wherein said backplane includes a media bus group having a plurality of media buses therein;

wherein said plurality of media buses are adapted to carry media data in packet form among said cards installed on said shelf under flow control; and wherein each media processor card on said shelf is assigned a specific address identity;

there being at least one bidirectional port on each media processor card, from and to which packets of media data may be transmitted;

wherein each bidirectional port on each media processor card has a unique identity on the respective media processor card;

wherein, when any bidirectional port on any media processor card wishes to send a packet of media data to another bidirectional port on any media processor card, said bidirectional port issues a request to transmit that packet of data;

wherein the request to transmit a packet of media data includes the identity of the intended receiving card, and the identity of the receiving bidirectional port on the intended receiving card;

wherein each bidirectional port on each media processor card outputs flow control information as to whether that bidirectional port can or cannot accept packets of media data that are intended to be sent to that bidirectional port at any instant in time;

wherein each media processor card outputs flow control information for each bus in said media bus group as to whether that card can or cannot accept packets of media data that are intended to be sent to that card over each respective bus at any instant in time;

wherein said data server further includes a bus arbiter on said first card having said bus controller function, the purpose of said bus arbiter being to review the flow control status of each output position and each bidirectional port thereat, to review the flow control status of each bus in said media bus group, to process requests to transmit packets of data from each bidirectional port on each media processor card, and to grant requests to transmit packets of media data only for those packets of media data that are intended to be transmitted to destination addresses that are not flow controlled, where the grants are given only for transmission over buses that are not flow controlled;

wherein all ports and all cards that have received grants to transmit packets of media data will place their specified packets of media data onto the respective granted buses, starting at the same instant in time;

wherein each media processor card has a plurality of bidirectional ports thereon, from and to which packets of media data may be transmitted, and wherein each of said plurality of bidirectional ports has a unique identity; and wherein each bidirectional port on each media processor card has an urgent flag which said bidirectional port may set when necessary, and wherein when any packet of media data to be sent from any bidirectional port on any media card has a high priority, each respective bidirectional port on each respective card will set its urgent flag.

2. The data server of claim 1, wherein said first card is a shelf controller card having said bus controller function thereon.

3. The data server of claim 1, wherein each bus has a unique identity.

4. The data server of claim 1, wherein said requests to transmit packets of media data are processed by said bus arbiter in a manner such that those requests which have a high priority are processed before other requests having a lower priority.

5. The data server of claim 1, wherein said data server is configured as a media server for use in networks wherein packetized voice data are transmitted through said network.

6. The data server of claim 1, wherein said data server is configured as a media gateway for use in networks wherein packetized voice data are transmitted through said network.

7. The data server of claim 1, wherein each bidirectional port on each media processor card is associated with at least one receive buffer.

8. The data server of claim 7, wherein the flow control information for each bidirectional port on each media processor card is by way of a flow control flag for each one of said bidirectional ports on said card.

9. The data server of claim 1, wherein the flow control information for each bus in said media bus group is by way of a flow control flag for each bus.

10. A data server for use in networks where media are transmitted in packet form, where such media are chosen from the group consisting of packetized audio data, packetized video data, packetized control data, packetized information data, and combinations thereof, said data server comprising:
at least a first card shelf containing cards installed thereon including a card having a bus controller function and a plurality of media processor cards, and a backplane;
wherein said backplane includes a media bus group having a plurality of media buses therein;
wherein said plurality of media buses are adapted to carry media data in packet form among said cards installed on said shelf under flow control; and
wherein each media processor card on said shelf is assigned a specific address identity;
there being at least one bidirectional port on each media processor card, from and to which packets of media data may be transmitted;
wherein each bidirectional port on each media processor card has a unique identity on the respective media processor card;
wherein, when any bidirectional port on any media processor card wishes to send a packet of media data to another bidirectional port on any media processor card, said bidirectional port issues a request to transmit that packet of data;
wherein the request to transmit a packet of media data includes the identity of the intended receiving card, and the identity of the receiving bidirectional port on the intended receiving card;
wherein each bidirectional port on each media processor card outputs flow control information as to whether that bidirectional port can or cannot accent packets of media data that are intended to be sent to that bidirectional port at any instant in time;
wherein each media processor card outputs flow control information for each bus in said media bus group as to whether that card can or cannot accept packets of media data that are intended to be sent to that card over each respective bus at any instant in time;
wherein said data server further includes a bus arbiter on said first card having said bus controller function, the purpose of said bus arbiter being to review the flow control status of each output position and each bidirectional port thereat, to review the flow control status of each bus in said media bus group, to process requests to transmit packets of data from each bidirectional port on each media processor card, and to grant requests to transmit packets of media data only for those packets of media data that are intended to be transmitted to destination addresses that are not flow controlled, where the grants are given only for transmission over buses that are not flow controlled;
wherein all ports and all cards that have received grants to transmit packets of media data will place their specified packets of media data onto the respective granted buses, starting at the same instant in time;
wherein each media processor card has a plurality of bidirectional ports thereon, from and to which packets of media data may be transmitted, and wherein each of said plurality of bidirectional ports has a unique identity;
wherein said bus arbiter will determine the order in which said requests to transmit packets of media data are to be processed, in keeping with a predetermined algorithm; and
wherein requests from media processing cards having more packets of media data to be transmitted at any instant in time are processed prior to requests from media processor cards having fewer packets of media data to be transmitted at that instant in time, in keeping with said predetermined algorithm.

11. The data sever of claim 10, wherein said requests to transmit packets of media data are processed by said bus arbiter in keeping with said predetermined algorithm, so that requests having a higher priority are processed before requests having a lower priority are processed.

12. The data server of claim 10, wherein when any requests to transmit packets of media data are not granted, those requests are given a higher priority by said bus arbiter for the next instant in time when said requests to transmit packets of media data are to be processed thereby.

13. A data server for use in networks where media are transmitted in packet form, where such media are chosen from the group consisting of packetized audio data, packetized video data, packetized control data, packetized information data, and combinations thereof, said data server comprising:
at least a first card shelf containing cards including a card having a bus controller function and a plurality of media processor cards, and a backplane;
wherein said backplane includes a media bus group having a plurality of media buses therein;
wherein said plurality of media buses are adapted to carry media data in packet form among said cards installed on said shelf under flow control; and
wherein each media processor card on said shelf is assigned a specific address identity;
there being at least one bidirectional port on each media processor card, from and to which packets of media data may be transmitted;

wherein each bidirectional port on each media processor card has a unique identity on the respective media processor card;

wherein, when any bidirectional port on any media processor card wishes to send a packet of media data to another bidirectional port on any media processor card, said bidirectional port issues a request to transmit that packet of data;

wherein the request to transmit a packet of media data includes the identity of the intended receiving card, and the identity of the receiving bidirectional port on the intended receiving card;

wherein each bidirectional port on each media processor card outputs flow control information as to whether that bidirectional port can or cannot accept packets of media data that are intended to be sent to that bidirectional port at any instant in time;

wherein each media processor card outputs flow control information for each bus in said media bus group as to whether that card can or cannot accept packets of media data that are intended to be sent to that card over each respective bus at any instant in time;

wherein said data server further includes a bus arbiter on said first card having said bus controller function, the purpose of said bus arbiter being to review the flow control status of each output position and each bidirectional port thereat, to review the flow control status of each bus in said media bus group, to process requests to transmit packets of data from each bidirectional port on each media processor card, and to grant requests to transmit packets of media data only for those packets of media data that are intended to be transmitted to destination addresses that are not flow controlled, where the grants are given only for transmission over buses that are not flow controlled;

wherein all ports and all cards that have received grants to transmit packets of media data will place their specified packets of media data onto the respective granted buses, starting at the same instant in time;

wherein each media processor card has a plurality of bidirectional ports thereon, from and to which packets of media data may be transmitted, and wherein each of said plurality of bidirectional ports has a unique identity;

wherein said bus arbiter will determine the order in which said requests to transmit packets of media data are to be processed, in keeping with a predetermined algorithm; and wherein said bus arbiter balances the priority of bidirectional ports and media processor cards, in keeping with said predetermined algorithm, in a manner so that no port and no card has an unfair advantage over any other port or any other card, respectively, as to the requests to transmit packets of media data being sent thereby.

* * * * *